(12) United States Patent
Krell (10) Patent No.: US 7,392,897 B2
(45) Date of Patent: Jul. 1, 2008

(54) VIBRATIONAL LINEAR CONVEYOR

(75) Inventor: Helmut Krell, Suhl (DE)

(73) Assignee: Feintool International Holding, Lyss (CH)

( * ) Notice: Subject to any disclaimer, the term of this patent is extended or adjusted under 35 U.S.C. 154(b) by 768 days.

(21) Appl. No.: 10/793,134

(22) Filed: Mar. 4, 2004

(65) Prior Publication Data
US 2007/0181405 A1    Aug. 9, 2007

(30) Foreign Application Priority Data
Mar. 21, 2003  (DE)  ............................. 103 12 706

(51) Int. Cl.
*B65G 27/28* (2006.01)
(52) U.S. Cl. ...................... 198/760; 198/769
(58) Field of Classification Search ............ 198/760, 198/767, 769
See application file for complete search history.

(56) References Cited

U.S. PATENT DOCUMENTS

| 3,667,939 | A | * | 6/1972 | Hecht et al. ............... 420/439 |
| 4,313,535 | A | * | 2/1982 | Carmichael ............... 198/766 |
| 5,462,155 | A | * | 10/1995 | Demar et al. ............. 198/760 |

FOREIGN PATENT DOCUMENTS

| DE | 3642183 A1 | * | 7/1987 |
| DE | 37 17 766 | | 12/1987 |
| DE | 0 529 185 | | 3/1993 |
| DE | 43 26 146 | | 2/1995 |
| EP | 644134 A1 | * | 3/1995 |

* cited by examiner

*Primary Examiner*—Mark A Deuble
(74) *Attorney, Agent, or Firm*—Jordan and Hamburg LLP (57) ABSTRACT

Vibrational linear conveyor for conveying workpieces and powdery or granular materials with a useful mass and a counter mass, which are equal in magnitude, are mounted separately at a vibrating system and, for conveying, can be brought into an opposite oscillating or vibrating movement over an electromagnetic exciter element comprising a magnet coil and a magnet armature, both of which are parts of the useful or counter mass. The workpieces or materials are transported by means of the oscillating or vibrating movement on a trough-like conveying element, which is part of the useful mass, along the conveying element, the useful and counter masses of the same magnitude lying essentially one above the other and being built up symmetrically on either side of a vertical central plane, in which the centers of mass of the useful and counter masses are resting on a common line of action. Various conveying elements are fastened interchangeably, an element-specific additional mass being provided, which is disposed at or mounted and designed at a conveying element or another part of the useful mass in such a manner, that the total weight of the useful mass as well as the position of the centers of the useful mass remained essentially the same, the total weight of the useful mass corresponding to that of the counter mass.

10 Claims, 6 Drawing Sheets

VIBRATIONAL LINEAR CONVEYOR

BACKGROUND OF THE INVENTION

The invention relates to a vibrational linear conveyor for conveying workpieces and powdery or granular materials with a useful mass and a counter mass, which are equal in magnitude, are mounted separately at a vibrating system and, for conveying, can be brought into an opposite oscillating or vibrating movement over an electromagnetic exciter element comprising a magnet coil and a magnet armature, both of which are parts of the useful or counter mass. By means of the oscillating or vibrating movement, the workpieces or materials on a trough-like conveying element, which is part of the useful mass, are transported along the conveying element.

Such a vibrational linear conveyor is known, for example, from the European patent 0 529 185 B1. The conveying principle of such a linear conveyor is based on a micro-flow principle. Due to the oscillating or vibrating movement of the conveying element, the workpieces or materials on the latter are thrown in the conveying direction. Admittedly, the throwing movement is minimal. However, because of the high oscillating or vibrating frequency, there is a continuous longitudinal movement. By these means, workpieces, which are to be installed or passed on further, are transported or ordered in the form of subminiature components, which are passed on, for example, by a vibrational helical conveyor to the linear conveyor and, over the latter, are then passed onto an automatic production machine. It is also possible to convey powdery or granular materials or the like. In order to avoid, as far as possible, any transferor of vibrations to a table or a frame, at or on which such a linear conveyor is disposed, a useful mass and a counter mass are provided for a vibrational linear conveyor of the type named above and brought into the opposite oscillating or vibrating movement by an exciter element. In other words, they carry out an opposite, sinusoidal oscillating movement. For producing the micro-throw movement, this oscillating movement is directed upward at an angle in the conveying direction. An electromagnetic exciter element with a magnet coil and a magnet armature and an associated magnet armature are provided for producing the vibration, the magnet coil being disposed, for example, at the counter mass and the magnet armature at the useful mass or vice versa. When the exciter element is operated appropriately, a continuous, opposite movement is produced because of the magnetic fields generated between the magnet coil and the magnet armature and the movement, in turn, is transferred to the respectively assigned masses.

The EP 0 529 185 B1 discloses a linear conveyor of the type named above, for which the useful mass and the counter mass are disposed lying next to one another, that is, lying parallel to one another. They are disposed at two spring elements, which form part of the vibrating system and are disposed at an angle with respect to the vertical. However, it is a disadvantage of such a linear conveyor that, because of the parallel arrangement of the masses, the vibrating forces, resulting from the vibrational accelerations of the two masses, although they act in mutually opposite directions, do not act on the same line of action. Consequently, in spite of the given equality of the useful and counter masses and, in the final analysis, of the reaction magnitude at the foundation, where the linear conveyor is mounted at the floor, these forces admittedly cancel one another. However, because of the asymmetrical arrangement and the divergence of the force directions, vibrating torques are produced, which are responsible for a tilting vibration of the linear conveyor as well as for a rotating vibration with respect to the vertical, which can lead to lateral vibrations especially at the ends of the conveying element. As a result, there may be difficulties with the conveying and transferring of workpieces or materials.

A further disadvantage of such a linear conveyor lies therein that its operational equipment is relatively complicated. In order to make a conveying operation possible utilizing the resonance behavior, it is necessary, on the one hand, to match the useful and counter masses as accurately as possible in their vibrational mounting, so that the natural frequency, with which each mass vibrates, is matched to the exciter frequency of the exciter element. This is accomplished with appropriate adjustment of the mounting of the respective mass at the vibrating system or at the springs, which is very complicated and requires much experience. Whenever there is a change in the mass relationship, matching must be carried out once again. In actual practice, however, it is frequently the case that a more flexible method of working is aimed for, that is, that a rapid exchange, for example, of workpieces, which are to be installed by a production machine, which necessarily also leads to the need to supply the other workpieces, which are to be installed, by means of a linear conveyor. The conveying element would have to be exchanged frequently for this purpose. However, this is not at all possible without the very expensive new installation.

SUMMARY OF THE INVENTION

It is an object of the invention to provide a linear conveyor which, on the one hand, makes an operation possible without the undesirable side effects, such as tilting vibrations or lateral vibrations, caused by the vibrations and, on the other, permits the conveyor to be installed flexibly and easily with respect to the goods that are to be conveyed differently.

Pursuant to the invention, this objective is accomplished for a vibrational linear conveyor of the type named above owing to the fact that the useful and counter masses of the same magnitude lie essentially one above the other and are built up symmetrically on either side of a vertical central plane, in which the centers of mass of the useful and counter masses are resting on a common line of action, and that various conveying elements can be fastened interchangeably, an element-specific additional mass being provided, which is disposed at or mounted and designed at a conveying element or on another part of the useful mass in such a manner, that the total weight of the useful mass as well as the position of the centers of the useful mass remain essentially the same. Due to this equality of useful mass and counter mass, the expensive new determination of the vibrating system can be omitted.

A construction, symmetrical with respect to the vertical central plane, is used for the inventive linear conveyor or for the linear conveyor and the conveying elements assigned to it, useful and counter masses being disposed so as to lie essentially above or within one another, as far as this is possible structurally. In this connection, both masses are conceived in such a manner, that their centers of mass lie on a common line of action, which, in turn, is perpendicular to the plane of the springs, which form the vibrating system. This line of action extends precisely in the vertical central plane, so that overall a completely symmetrical construction results. Due to this appropriate positioning and design of the masses with respect to their symmetry in relation to the central plane as well as with respect to the position of the centers of mass on a common line of action, a vibrational operation in opposite directions results, which does not lead to any tilting or lateral vibrations, since the vibrational forces of the useful and counter masses cancel one another in their absolute magnitudes and, because of the symmetry and the position of the centers of mass, there is no generation of resulting forces, which would act outside of the central median plane or the line of action and lead to vibrating torques, which act, in particular, on the foundation and otherwise would place high structural demands on the stiffness of the foundation. Overall, an extremely stable system, which does not produce any unintentional, interfering vibrations, results.

Furthermore, different conveying elements, which, in turn, form part of the useful mass, are fastened exchangeably at the linear conveyor or at the useful mass. For this purpose, appropriately suitable fastening means, which make a simple loosening and fastening possible, are provided. Since different conveying elements are required in order to convey different workpieces or materials, it is necessary, with respect to the symmetry and center of mass position described above, to ensure that these boundary conditions, which make a satisfactory operation possible, continue to be maintained in spite of the change in the conveying elements. Consequently, in order to be able to compensate for corresponding mass changes at the useful mass when the conveying element is exchanged and to achieve mass equality once again, element-specific additional masses, the weight of which is designed exactly with respect to a particular conveying element, are provided. They are or can be disposed at a conveying element or at a different part of the useful mass and are exchanged automatically when the conveying elements are exchanged. That is, mass equality is ensured by these additional masses. Furthermore, these additional masses are designed and are or can be disposed locally so that so that the position of the centers of useful mass also remains essentially the same. In other words, in spite of changes in the conveying element resulting from the use of appropriately designed and locally disposed additional masses, the position of the center of the useful mass remains on the common-line of action with the center of the counter mass.

This makes it possible to set up the linear conveyor easily and flexibly for conveying a different object without requiring major adjustment settings and the like. The structural boundary condition of "mass equality—symmetry and position of the centers of mass" is ensured in every case. Changes can be made successfully by any user without special knowledge and with little expenditure of time.

Pursuant to the invention, a single mass element or also several mass elements can be fastened or fastenable at the conveying element or at a different part of the useful mass as additional mass. If several mass elements are used, these can be disposed either at a common point or at offset sites at the conveying element or at a different part of the useful mass, depending on the design of the linear conveyor.

If the center of useful mass is at the conveying element itself, the mass elements can be fastened or fastenable essentially in the region of the center of useful mass.

From the point of view of setting up and adapting a linear conveyor simply, it is furthermore appropriate if a conveying element can be fastened so that its height can be varied, in order to be able to react in this way to any height differences at the transfer sites from the supplying device, such as a helical conveyor, to the linear conveyor and from the linear conveyor to the production machine. For this purpose, appropriate fastening elements, such as vertically slotted mounts, to which a conveying element can be bolted, etc., at various heights, are provided at the useful mass part, where a conveying element is fastened, or at the conveying element itself.

Pursuant to the invention, the vibrating system itself may include at least two spring systems, which have, in each case, three spring sections arranged in parallel, the useful mass being disposed at the middle spring sections and the counter masses at the two outer spring sections the two spring systems or vice versa. In other words, a construction, symmetrical with respect to the vertical central plane, which extends through the center of the middle spring section, is provided also with respect to the mounting of the masses at the vibrating system or at the spring systems of the latter. A spring system may consist of one leaf spring or of several leaf springs forming a package and slotted over a portion of its or their length, forming three spring sections. Alternatively, the possibility exists of forming a spring system from three separate leaf springs or leaf spring packages. At the lower end, a spring system is connected in each case to a base plate, over which the linear conveyor can then be bolted, for example, to a machine frame.

With regard to as compact a symmetrical construction as possible, it may be appropriate if the counter mass has essentially a U-shaped section, in which a section of the useful mass is accommodated. A reverse embodiment, for which the useful mass has an essentially U-shaped section, in which a section of the counter mass is accommodated, is also conceivable. In other words, the masses, as far as possible, are intertwined. However, in order to make a vibrational movement possible, they are still at same distance from one another, so that a compact, small construction results. The section accommodated may be constructed essentially T-shaped.

The inventive linear conveyor enables the user to use variably different conveying elements, the counter mass being fixed and the additional masses described being provided for equalizing the masses. In order to be able to convey objects having a different weight or a different size, it is frequently necessary to make available linear conveyors of different types with useful and counter masses of a different magnitude. In this regard, in order to make it possible for the manufacturer of the linear conveyor to fall back on standardized components, an additional mass, which increases the standardized counter mass, can be used, the exchangeable conveying elements and their element-specific additional masses being designed to correspond to the total counter mass. According to this development of the invention, the manufacturer can use a standardized counter mass, which represents a sort of "basic mass". This is used for the construction of a linear conveyor of a first type. If a linear conveyor of a second type is to be produced, for which larger counter and useful masses are required, the same standardized counter mass is employed. However, its weight is increased by using an additional mass. For a linear conveyor of a third type, an even larger additional mass is used. The useful mass or the exchangeable conveying elements and their element-specific additional masses in this case are designed quasi type-dependent and designed for the respective total counter mass.

Further advantages, distinguishing features and details of the invention arise out of the examples described below as well as from the drawings.

DESCRIPTION OF THE PREFERRED EMBODIMENTS

Figure 1:
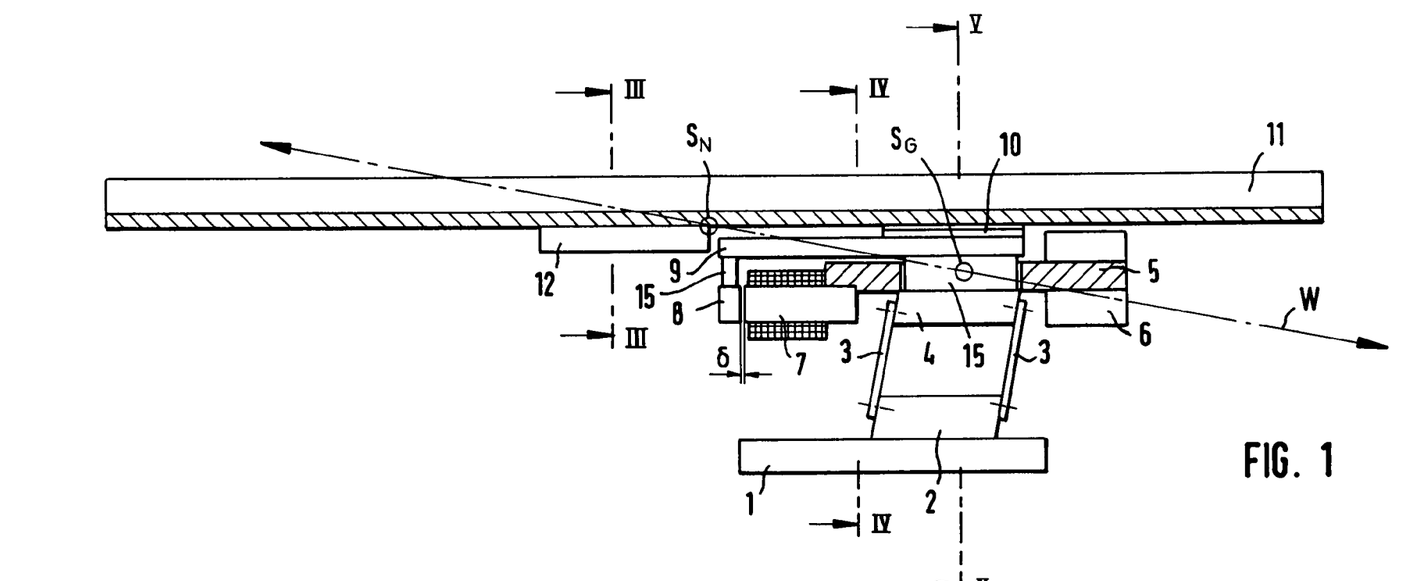
FIG. 1 shows a diagrammatic sectional representation of an inventive linear conveyor of a first embodiment.
Figure 2:
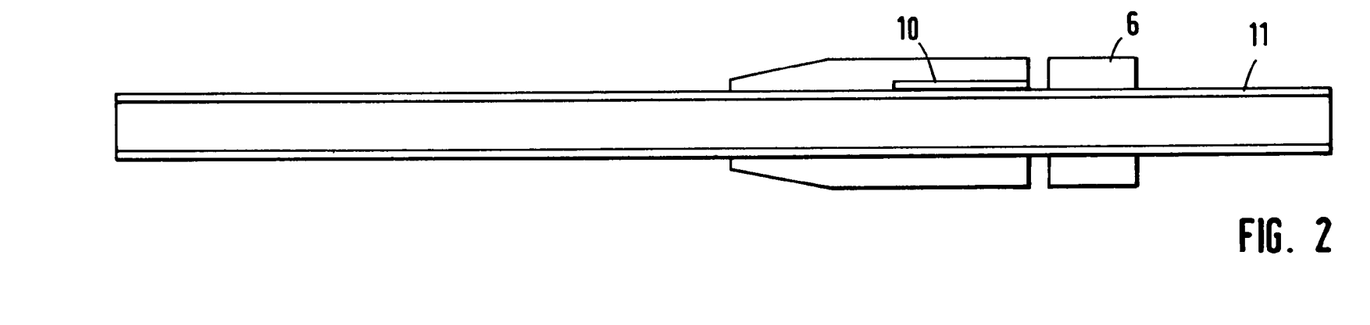
FIG. 2 shows a plan view of the linear conveyor of FIG. 1.
Figure 3:
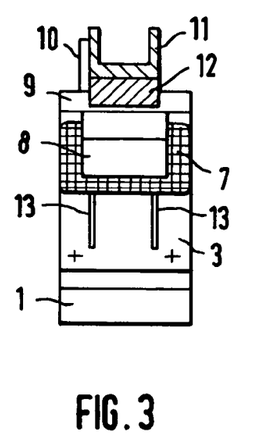
FIG. 3 shows a sectional view in the direction of the line III-III.
Figure 4:
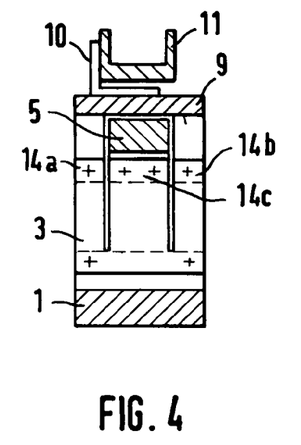
FIG. 4 shows a sectional view in the direction of the line IV-IV.
Figure 5:
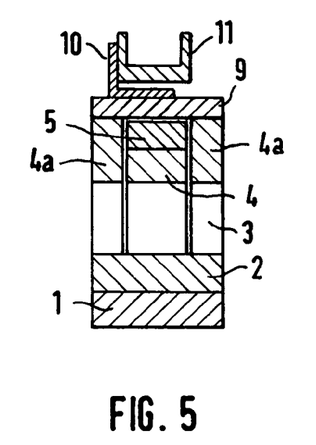
FIG. 5 shows a sectional view in the direction of the line V-V.
Figure 6:
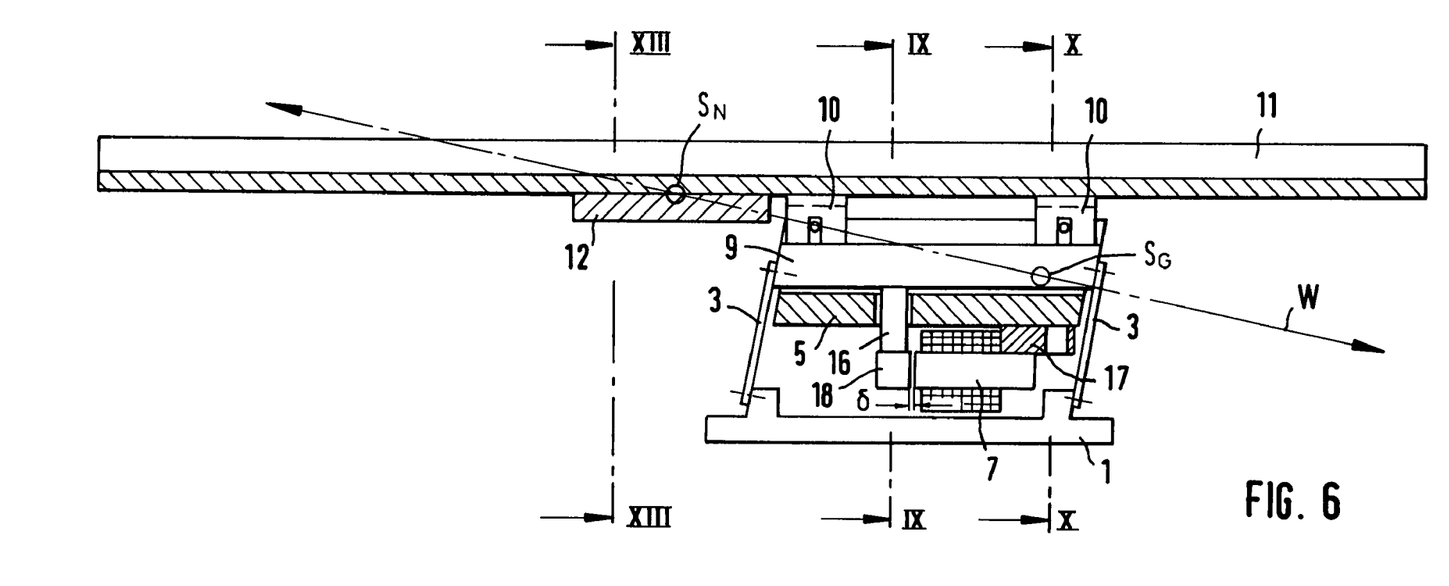
FIG. 6 shows a diagrammatic sectional representation of a linear conveyor of a second embodiment.
Figure 7:
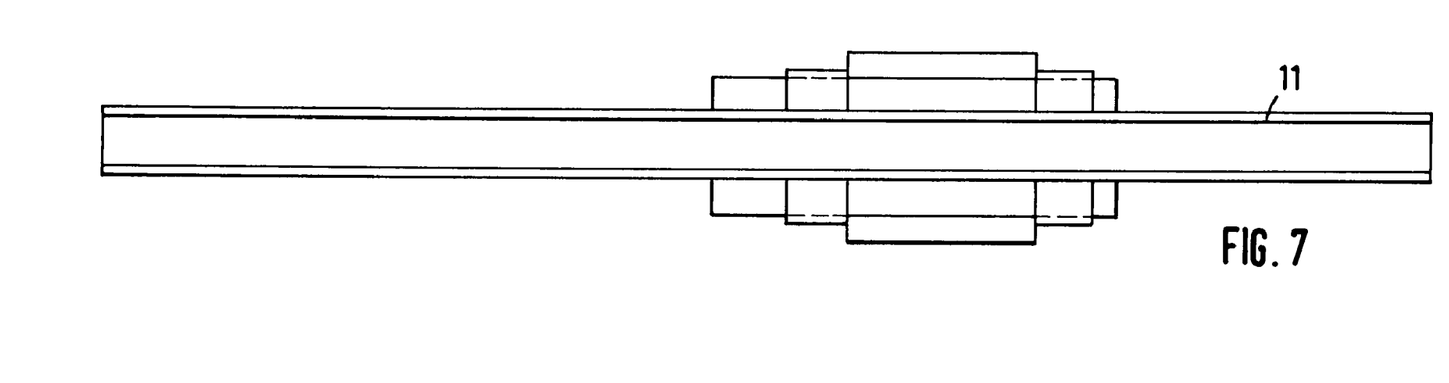
FIG. 7 shows the plan view of the conveyor of FIG. 6.

FIG. 1 shows a first embodiment of an inventive vibrational linear conveyor, comprising a base plate 1, by means of which the linear conveyor can be fastened, for example, to a machine table. A suspension bracket 2, at which two spring systems 3 are disposed on either side inclined at an angle of about 8° to 12° with the vertical, is disposed at the base plate. Each of these two spring systems 3 comprises a leaf spring or a leaf spring package, which is divided by slots 13 into three sections 14a, 14b and 14c starting from the upper end. A suspension bracket 4, at which a counter mass web 5 with an additional mass 6 is attached, is disposed at the upper end of the middle section 14c of the two spring systems 3. At the front end of the counter mass web 5, there is a magnet coil 7, through which, when the system is in operation, a current flows and a magnetic force is produced, which acts on a magnet armature 8, which is separated by an air gap δ. The suspension bracket 4, together with the counter mass web 5, the additional mass 6 and the magnet coil 7 forms the counter mass, which always remains the same for the design of an equipment type and is mounted so that it can vibrate freely by the build-up on the sections 14c of the conveying elements 3. At the upper ends of the sections 14a and 14b, two outer suspension brackets 4a are fastened, which are connected with one another over a build-up plate 9, at which, in turn, a fastening part 10 is provided, at which a conveying element 11, in this case a conveying rail, is disposed. At the conveying rail 11, in turn, there is an additional mass 12, which must be matched individually to the rail mass and equalize the difference between the counter mass and the useful mass, so that there is mass equality. The magnet armature 8 is arranged over a connecting piece 15 at the front end of the build-up plate 9 and separated from the magnet coil 7 by an air gap δ. The outer suspension brackets 4a, together with the build-up plate 9, the intermediate block 9a, the magnet armature 8, the fastening part 10, the fastening element 11 and the additional mass 12, form the useful mass, which, by individually matching the additional mass 12, must be of the same magnitude as the counter mass. The useful mass is also mounted over the sections 14a and 14b of the spring systems, so that it can vibrate freely. When it is in operation, current flows through the magnet coil of 7 and produces a magnetic force, which acts on the magnet armature 8, which is separated by an air gap δ. Since the useful and counter masses are mounted so that they can vibrate freely, they attract one another, so that an oppositely vibrating movement results.

The useful mass and the counter mass are designed to be equal in magnitude. This is necessary for an exactly opposite vibrational movement and for an equalization of the reaction forces at the foundation, that is, the base plate 1, resulting from the vibrational movements. The additional mass 6 serves to design the counter mass to correspond to the type of equipment.

It is evident that a symmetrical construction is realized in relation to the conveying direction (=axis of symmetry) in the case of the inventive linear conveyor. That is, because of the symmetrical construction, masses of equal magnitude are moving to the left and to the right of the axis of symmetry of the conveying direction. Furthermore, the two masses are designed in such a manner that the two centers of masses, namely the center of useful mass $S_N$ and the center of counter mass $S_G$, lie on a common line of action W, which, in turn, is essentially perpendicular to the spring systems. Due to this design of the useful and counter masses with respect to the position of their centers of masses, it is achieved that, while the system is being operated, there are no interfering tilting and lateral vibrations at the ends of the conveying element 11. The line of action W lies in the vertical plane, which extends through the axis of symmetry of the conveying direction, and, with that, also on the axis of symmetry.

The conveying element 11 itself is mounted detachably at the fastening element 10. Any fastening mechanism, such as suitable screws or plug-in and lock mechanisms can be used here. If the transporting requirements change and it becomes necessary to transport other objects, the conveying element 11 can be removed and exchanged for a different one, which is, for example, wider or profiled differently or is longer. To fulfill the requirement that the two centers of mass $S_N$ and $S_G$ once again are on the common line of action W even after the exchange, an appropriate additional mass, such as that represented by the additional mass 12, is disposed at the new conveying element in order, on the one hand, to arrive once again at the already previously specified total weight of the useful mass and, on the other, to ensure that this center of the useful mass $S_N$ once again is where it was when the exchanged conveying element was used. For this purpose, on the one hand, the additional mass is designed specifically for the new conveying element, that is, these two must necessarily be used together, and, on the other, the additional mass is also positioned locally in such a manner, that the center of mass constancy, which has been described, results.

Figure 8:
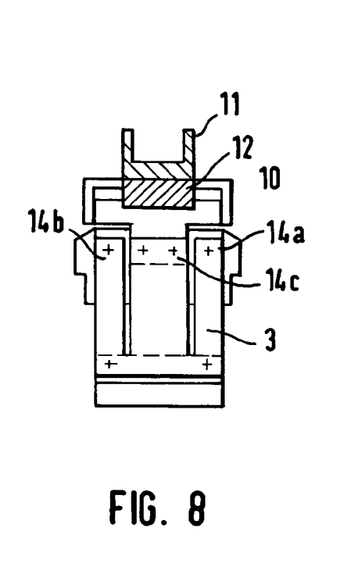
FIG. 8 shows a sectional view in the direction of the line VIII-VIII in FIG. 6.
Figure 9:
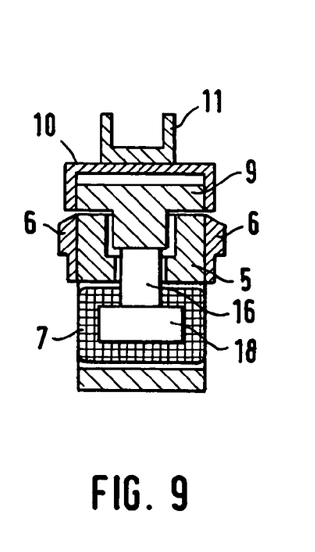
FIG. 9 shows a sectional view in the direction of the line IX-IX.
Figure 10:
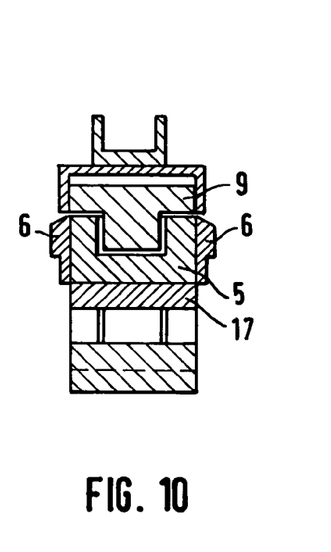
FIG. 10 shows a sectional view in the direction of the line X-X.
Figure 11:
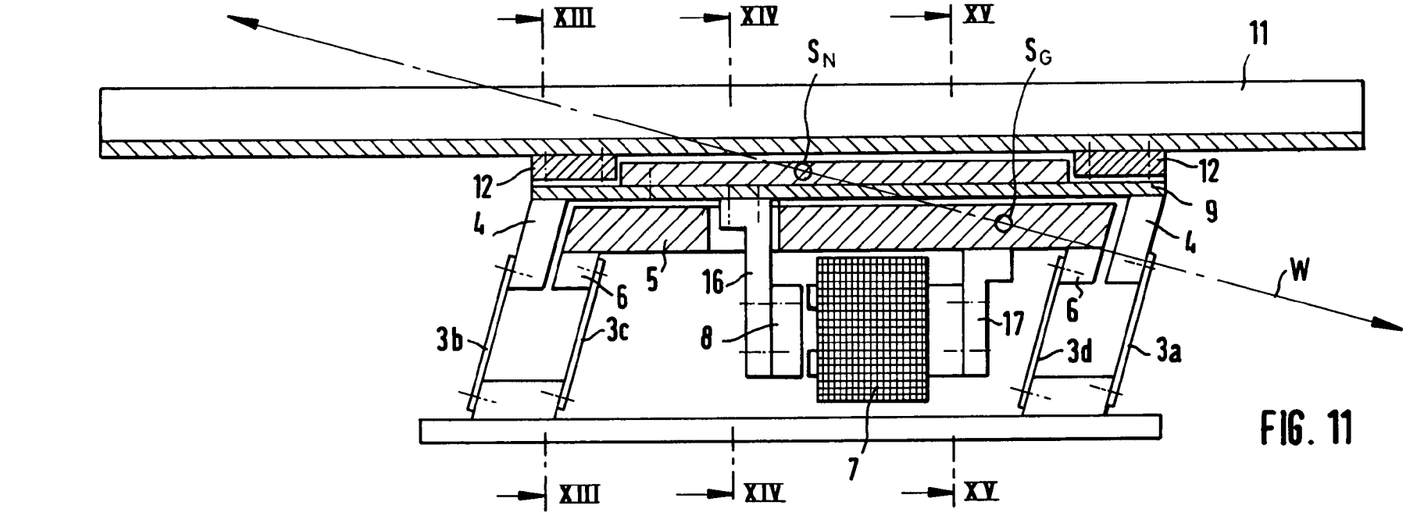
FIG. 11 shows a diagrammatic section of a third embodiment of a linear conveyor.
Figure 12:
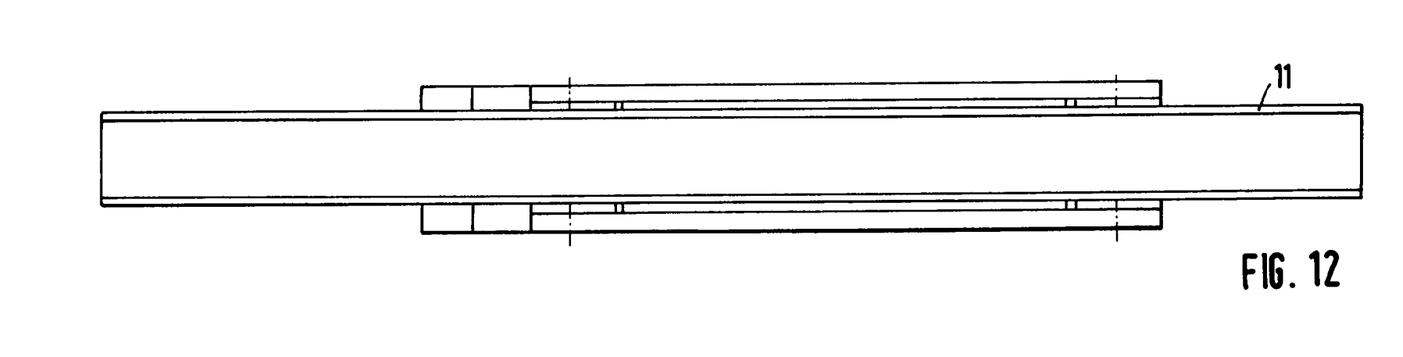
FIG. 12 shows a plan view of this linear conveyor.
Figure 13:
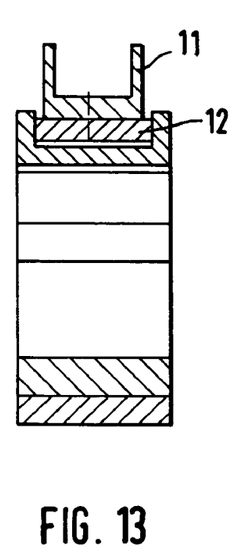
FIG. 13 shows a sectional view in the direction of the line XIII-XIII.
Figure 14:
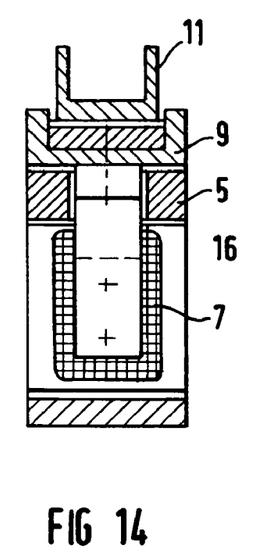
FIG. 14 shows a sectional view in the direction of the line XIV-XIV.
Figure 15:
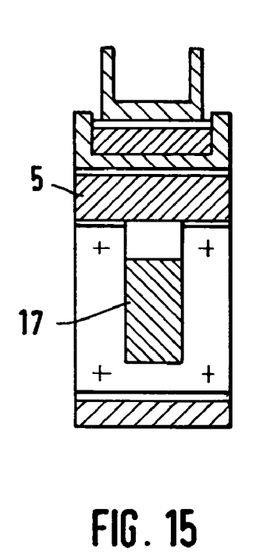
FIG. 15 shows a sectional view in the direction of the line XV-XV.

FIGS. 6-10 show a second embodiment of an inventive vibrational linear conveyor, for which basically the same functional elements are used as for the linear conveyor of FIGS. 1-5. However, they are used in a somewhat different geometric arrangement. Here also, a base plate 1 is provided, at which two spring systems 3 are disposed. These spring systems 3 once again are longitudinally slotted leaf springs or leaf spring packages (see, for example, FIG. 8). Here also, the counter mass consists of a magnet coil 7 as well as of a counter mass web 5, at which the magnet coil 7 is disposed. As shown by FIGS. 9 and 10, the counter mass web 5 is essentially U-shaped. On the other hand, the build-up plate 9 (see FIGS. 9 and 10) is essentially T-shaped and, at a distance, engages the counter mass web 5. Here also, at the build-up plate 9, the magnet armature 8, which passes through the counter mass 5 in a recess over an appropriate connecting piece 16, is connected with the build-up plate 9. The rail-like conveying element 111 is fastened over appropriate fastening elements 10 at the build-up plate 9. In this case, the fastening elements 10 are brackets, which are provided with vertical slots. The vertical slots enable the conveying element 11 to be arranged at variable heights at the build-up plate 9. As shown by FIGS. 8-10, the build-up plate 9 is mounted flexibly here at the middle spring section 14c of the spring systems, whereas the counter mass web 5 is fastened to the two spring sections 14a and 14b. Here also, there is the possibility of separate movement, a symmetrical construction with respect to the conveying direction being realized also here. When current is flowing through the magnet coil 7, opposite movements are produced by the interaction between the magnet coil 7 and the magnet armature 8, which here also is separated by an air gap δ.

Here also, the useful mass comprises of the conveying element 11, with the in-place additional mass 12, the fastening elements 10, the build-up plate 9, the connecting piece 16 as well as the magnet armature 8, whereas the counter mass comprises the magnet coil 7, a fastening piece 17 connecting the latter with the counter mass web 5, and lateral additional masses 6 for equalizing the mass.

It is evident here also that the useful and counter masses are designed in such a manner, that the center of useful mass $S_N$ and the center of counter mass $S_G$ are aligned with one another on a common line of action W, the line of action here also being essentially perpendicular to the plane of the spring systems 3.

As in the case of the previously described embodiment, the conveying element 11 is detachable here also and can be exchanged for a different one. Using an element-specific additional mass 12, each conveying element 11 is designed in such a manner, that the total of the useful mass remains the same independently of the conveying element, and that the center of useful mass $S_N$, also independently of the conveying element used, lies essentially in the same position, that is, is aligned with the center of counter mass $S_G$ on the line of action W. This embodiment also permits the linear conveyor to be set up and modified flexibly. In the example shown, the additional mass for the conveying element 11 shown is disposed essentially precisely at the center of mass $S_N$. Of course, depending on the conveying element 11 used, a different positioning of the additional mass 12 is also possible or possibly necessary.

Finally, FIGS. 11-15 show a third embodiment. This also comprises essentially the elements shown in the corresponding embodiments of the previously described Figures. However, four spring systems 3a, 3b, 3c, 3d are used here, which are connected one behind the other and aligned with one another. As can be inferred from FIG. 11, the useful mass, comprising the conveying device 11, the two additional masses 12 disposed at the conveying device 11, the build-up plate 9, the suspension brackets 4, the connecting part 16 as well as this magnet armature 8, are disposed at the spring systems 3a, 3b. The counter mass, comprising the counter mass web 5, the connecting part 17, the suspension brackets and the magnet coil 7, is disposed at the inner spring systems 3c and 3d. Here also, both can vibrate separately and equally opposite to one another when the magnet coil 7 is in operation. A symmetrical construction with respect to the conveying direction is realized here also.

Furthermore, the useful and counter masses are designed in such a manner here also, that the center of the useful mass $S_N$ and the center of counter mass $S_G$ lie on a common line of action W, which is essentially perpendicular to the plane of the spring systems. For this embodiment also, this is not changed when the conveying element 11 is exchanged. Each conveying element 11, as well as the element-specific additional mass 12, is designed in such a manner that, independently of the conveying element and additional masses used, the center of useful mass $S_N$ remains essentially unchanged.

The invention claimed is:

1. A vibrational linear conveyor for conveying workpieces and powdery or granular materials, comprising:
   an oscillation system;
   a useful mass and a counter mass being mounted separately on said oscillation system, the useful mass and the counter mass being disposed essentially one above the other and being arranged symmetrically on either side of a vertical central plane, respective centers of gravity of the useful mass and the counter mass lying on a common line of action;
   an electromagnetic exciter element comprising a magnet coil and a magnet armature each which comprises a portion of the useful mass or the counter mass, said electromagnetic exciter element imparting an opposite oscillatory or vibratory movement to said useful mass and said counter mass; and
   variously configured trough-shaped conveying elements each, in combination with at least one element-specific additional mass carried thereon, collectively defining an integrated conveying unit, each said integrated conveying unit being interchangeably fastenable on said oscillation system so as to comprise a portion of said useful mass, each said integrated conveying unit having a predetermined weight such that a total weight of the useful mass is equalized with that of the counter mass when the integrated conveying unit is fastened on said oscillation system, said at least one additional mass being disposed in a position along each of said conveying elements such that a position of the center of gravity of the useful mass remains essentially the same when one said integrated conveying unit is replaced by another said integrated conveying unit.

2. The vibrational linear conveyor according to claim 1, wherein said at least one additional mass includes one or more mass elements fixed to at least one of the conveying elements.

3. The vibrational linear conveyor according to claim 2, wherein the one or more mass elements are fixed at a common point or at points staggered along the at least one of the conveying elements.

4. The vibrational linear conveyor according to claim 3, wherein:
   the center of gravity of the useful mass lies in the at least one of the conveying elements itself; and
   the mass element or elements are fixed essentially in a region of the center of gravity of the useful mass.

5. The vibrational linear conveyor according to claim 1, wherein at least one of the conveying elements is fixable at variable heights.

6. The vibrational linear conveyor according to claim 1, wherein oscillation system comprises at least two spring systems, each of which has three spring sections which are disposed in parallel, the useful mass being disposed at a middle one of the spring sections and the counter mass at two outer spring sections of the at least two spring systems or vice versa.

7. The vibrational linear conveyor according to claim 6, wherein one of the spring systems comprises a leaf spring or several leaf springs forming a package which is or are slotted over a portion of a length thereof forming three spring sections, or the one of the spring systems comprises three separate leaf springs or three leaf spring packages.

8. The vibrational linear conveyor according to claim 1, wherein the counter mass has essentially a U-shaped section in which a section of the useful mass is accommodated, or the useful mass has essentially a U-shaped section in which a section of the counter mass is accommodated.

9. The vibrational linear conveyor according to claim 8, wherein the section of the useful mass or of the counter mass accommodated is essentially T-shaped.

10. The vibrational linear conveyor according to claim 1, further comprising an additional mass increasing the counter mass, the exchangeable conveying elements and the element-specific additional masses each comprising said integrated conveyer unit being designed to correspond to a total weight of the counter mass.

* * * * *